United States Patent [19]

Herring, Sr.

[11] Patent Number: 4,491,087
[45] Date of Patent: Jan. 1, 1985

[54] ANIMAL FEEDER ESPECIALLY FOR FEEDING PIGS AND THE LIKE

[76] Inventor: William T. Herring, Sr., P.O. Box 308, New Grove, N.C. 28366

[21] Appl. No.: 576,722

[22] Filed: Feb. 3, 1984

[51] Int. Cl.³ .............................................. A01K 5/00
[52] U.S. Cl. ..................................... 119/53.5; 119/54
[58] Field of Search ........................... 119/53, 53.5, 54

[56] References Cited

U.S. PATENT DOCUMENTS

| | | | |
|---|---|---|---|
| 3,552,360 | 1/1971 | Nelson | 119/53.5 |
| 3,565,044 | 2/1971 | Sorrels | 119/53 |
| 4,306,518 | 12/1981 | Herring | 119/53.5 |

Primary Examiner—Hugh R. Chamblee
Attorney, Agent, or Firm—Bell, Seltzer, Park & Gibson

[57] ABSTRACT

An animal feeder, with separate pivotally supported gates on each side thereof which are generally vertically adjustable by adjustment means readily accessible at each side of the apparatus for varying the size of the respective feed discharge openings, is provided with means for permitting enhanced agitation of the feed in the hopper and means for improving the control of feed from the hopper including means overlapping with the ends of the pivotally supported gates for preventing feed from the feeder storage hopper from flowing around the side ends of the gates, and also with locking means for many easily securing the gates in desired vertically adjusted positions while permitting increased agitation of the feed in the hopper.

9 Claims, 7 Drawing Figures

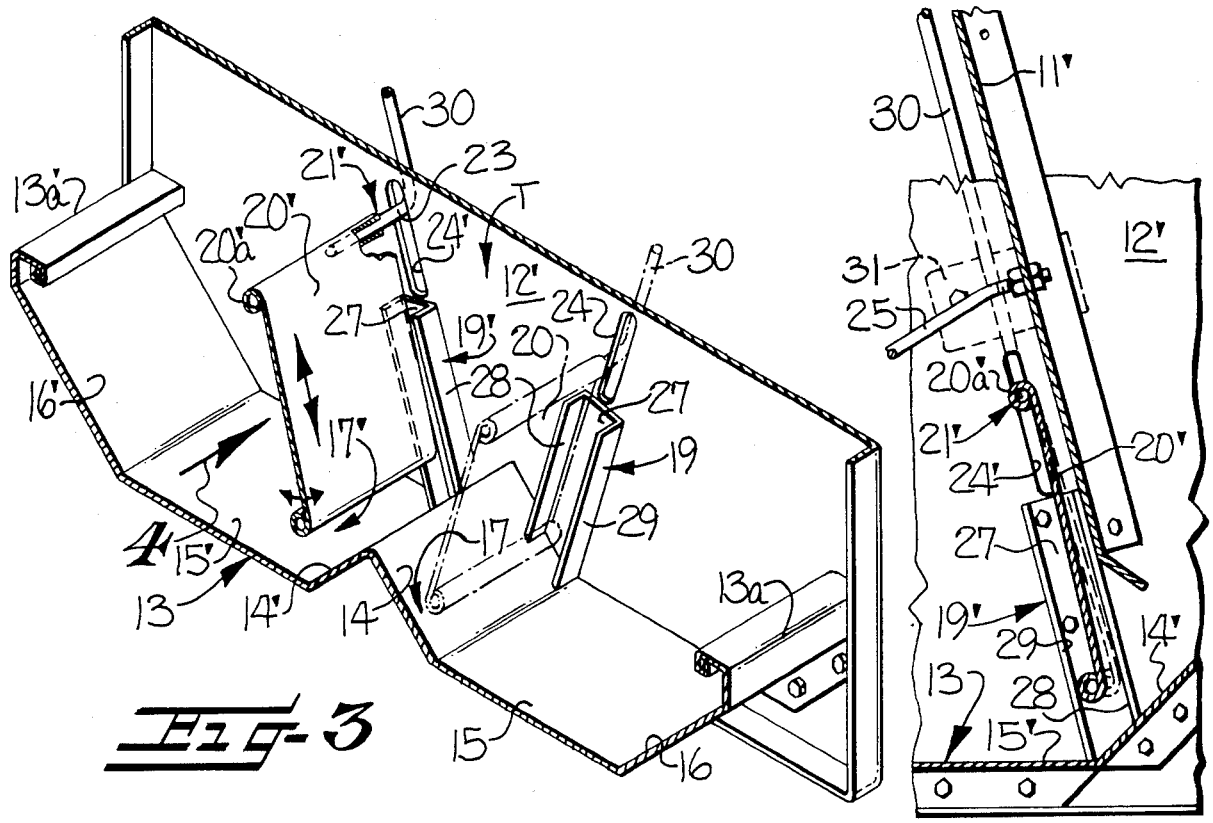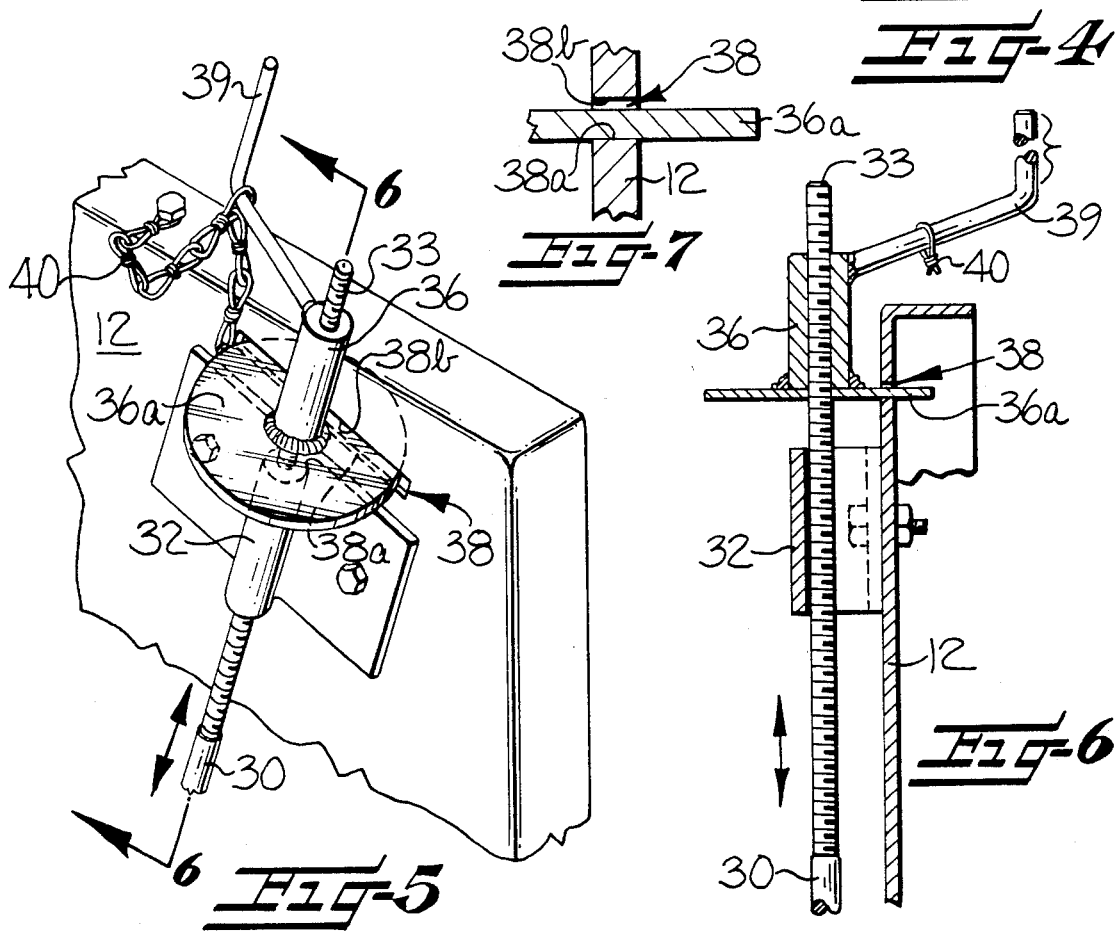

ANIMAL FEEDER ESPECIALLY FOR FEEDING PIGS AND THE LIKE

This invention relates to animal feeders of the type used for feeding pigs and the like.

Pigs are often fed finely ground dry feed provided to them from gravity feeders having storage hoppers including pivotally mounted gates for controlling the flow of feed from the hoppers. Such gates are so mounted and constructed as to permit agitation of the feed upon pivotal movement of the gates by the snouts of the pigs.

As is known to those familiar with the raising of pigs, the amount of feed provided by any given agitation should be minimal, so as to reduce waste, and yet should also be continuous upon agitation, so as to properly supply feeding pigs in an efficient manner. A most desirable situation is one in which only a shallow layer of feed is presented to the feeding pigs, and in which this shallow layer can be properly replenished when the feeder is agitated by the feeding pigs.

One agitation type of feeder as disclosed in my U.S. Pat. No. 4,306,518 has a pair of opposing vertically adjustable pivotally mounted gates for controlling the flow of feed through discharge openings defined by the lower portions of the gates. Pivotally mounted gates provide a method of delivering feed in which the engagement of the pig's snouts with the gates during feeding pivots the gates, which in turn, agitate the feed, allowing the feed to flow more easily. The vertical adjustability of such gates additionally allows the feed discharge openings in the feeder to be varied in size, thus providing a method of controlling the flow of feed to the pigs. Locking means are additionally provided for limiting the amount of vertical movement of the gates from the desired positions of vertical adjustment thereof.

It has been found, however, that the use of such gates requires that the width of the gates be shorter than the boundary or end walls between which they extend and pivot. There are several reasons for this requirement. First, in order to avoid contact and provide for pivotal movement sufficient for desired agitation of the gates by the pigs, a small clearance must exist between the end walls and the end edges of the pivotal gates. Also, in a type of feeder wherein the size of each feed discharge opening is adjusted by the use of individual adjustment means on each end of each gate, a certain clearance must exist for allowing each gate to freely pivot, even if one end is vertically adjusted to a slightly different position than is the other end, thus suspending the gate on a pivotal axis extending at an angle somewhat different from true horizontal. Further, in order that the feding pigs may impart a small, but desirable, longitudinal agitation to the gates, this same clearance between the end walls and the gates must exist. Consequently, for the above and other reasons, the width of each gate must be less than the width of the opening in which it is to pivot.

The use of gates somewhat narrower than their respective openings, however, creates a problem in controlling the flow of feed. The resulting slight clearance, that remains open between each end of each gate and the wall of the opening in which the gate pivots, allows some feed to flow around each end of the gate rather than entirely under the gate, as is most desired. In the preferred embodiment of the invention, means are positioned adjacent opposite ends of each of the gates and overlap with the ends of the gates for preventing flow of feed from the storage hopper around the ends of the gates. This means is preferably in the form of sustantially U-shaped brackets positioned on the end walls of the feed hopper and loosely straddling the respective ends of the gates. Each bracket is positioned to cooperate with one end of each gate so as to obstruct the feed from flowing around the end of, rather than under, the gate. Because these U-shaped brackets loosely straddle the respective ends of the gates, the gates remain free to pivot, allowing the feeding pigs to impart pivotal movement to them, thus agitating the feed and aiding in its flow from the storage hopper. Similarly, the brackets do not prevent the limited longitudinal movement of the gates which also desirably agitates the feed.

In the type of feeder using vertically adjustable pivotally mounted gates, it is further desirable to provide convenient means for both making and maintaining or locking the vertical adjustment. The nature of the use of such feeders is such that, while the pivotal gates are located at or near the bottom of the feeder, adjustment and locking of the gates is most desirably made from the top of the feeder. There are several reasons for this preference. A first reason is the easy accessibility of adjustment and locking means located at the top of the feeder, away from the lower portions of the feeder which are often soiled with feed, dirt, animal waste and the like. A second reason is that, in actual use, feeders are often positioned end-to-end in rows, making access to side adjustment and locking means difficult or impossible. Conversely, if a feeder has only side-located adjustment and locking means, an arrangement of the feeders in close proximity in side-by-side relation in each of the rows of feeders is precluded if frequent adjustment and relocking of the gates is desired. A third reason is that a top location of the gate adjustment and locking means helps prevent pigs from reaching and changing the adjustment means. The locking means serves the additional function of predeterminedly limiting the extent to which the gates may be lifted by the feeding pigs. While a small amount of upward or vertical movement of the gates by the pigs desirably aids agitation, it will be seen that should the pigs be able to vertically lift the gates to an unlimited extent, many of the advantages of a feeder using vertically adjustable pivoting gates to control the flow of feed would be essentially negated.

With respect to the foregoing, it is a further object of this invention to provide improved gate adjustment means and locking means. In the preferred embodiment of the invention, there are provided elongate adjustment means, which may take the form of rod-like adjustable members, connected to respective ends of the gates, which elongate means are generally vertically positioned and extend upwardly alongside the opposing end walls of the feed storage hopper. These elongate means have threaded upper end portions upon which respective threaded members are positioned. The threaded members are restrained from vertical movement relative to the hopper end walls to aid in locking the gates in the desired positions, and means, such as crank handles, are connected to the threaded members for facilitating the rotation of the threaded members. Rotation of the threaded members in turn, imparts vertical movement to the pivotally mounted gates, thus providing for the desired adjustments.

In order to restrain the threaded members and thereby lock the gates in the desired position, the hopper end walls have openings or slots therein suitable for receiving portions of the threaded members. When portions of the threaded members are received in these openings, they may freely be rotated, but are restrained from unlimited vertical movement by the cooperating contacting relationship between the threaded members and the boundaries of the openings formed in the end walls. The resulting cooperation between these openings and the portions of the threaded members which are received therein prevents undesired, unlimited vertical movement of the adjustment means relative to the hopper end walls.

BRIEF DESCRIPTION OF THE DRAWINGS

Some of the objects and advantages of the invention having been stated, others will appear as the description proceeds when taken in connection with the accompanying drawings in which:

FIG. 3 is a perspective fragmentary view of one end wall, the bottom wall, the pivotally mounted gates, the U-shaped brackets and portions of the elongate adjustable means for vertically adjusting the gates;

FIG. 4 is a cross sectional view taken looking in the direction of the arrow 4 of FIG. 3 and showing one of the pivotally mounted gates resting in a normal outer inclined position and also showing, in broken lines, its potential innermost inclined position, both relative to the respective U-shaped bracket, and also including one of the downwardly sloping walls of the feed storage hopper;

FIG. 5 is a perspective view of the adjustment means including the threaded upper end portions of the elongate adjustment means, the threaded member and the manually engagable means shown as a crank handle;

FIG. 6 is an enlarged cross-sectional view taken substantially along line 6—6 of FIG. 5; and FIG. 7 is an enlarged, cross-sectional view of the locking means, showing the opening in the side wall and the flange portion of the threaded member which together serve as the locking means.

DETAILED DESCRIPTION

Referring more specifically to the drawings, the feeder apparatus, broadly designated at 10, comprises an open-topped hopper defined by opposing downwardly sloping side walls 11, 11' and opposing substantially vertically disposed end walls 12, 12'. The opposing end walls 12, 12' are of substantially rectangular shape and their upper edges are preferably positioned on substantially the same level as the upper edges of the downwardly sloping side walls 11, 11'. The lower edges of the opposing end walls 12, 12', however, terminate a substantial distance below the lower edges of the opposing side walls 11, 11' and are suitably secured to opposed ends of a bottom wall means which is broadly designated at 13.

Figure 2:
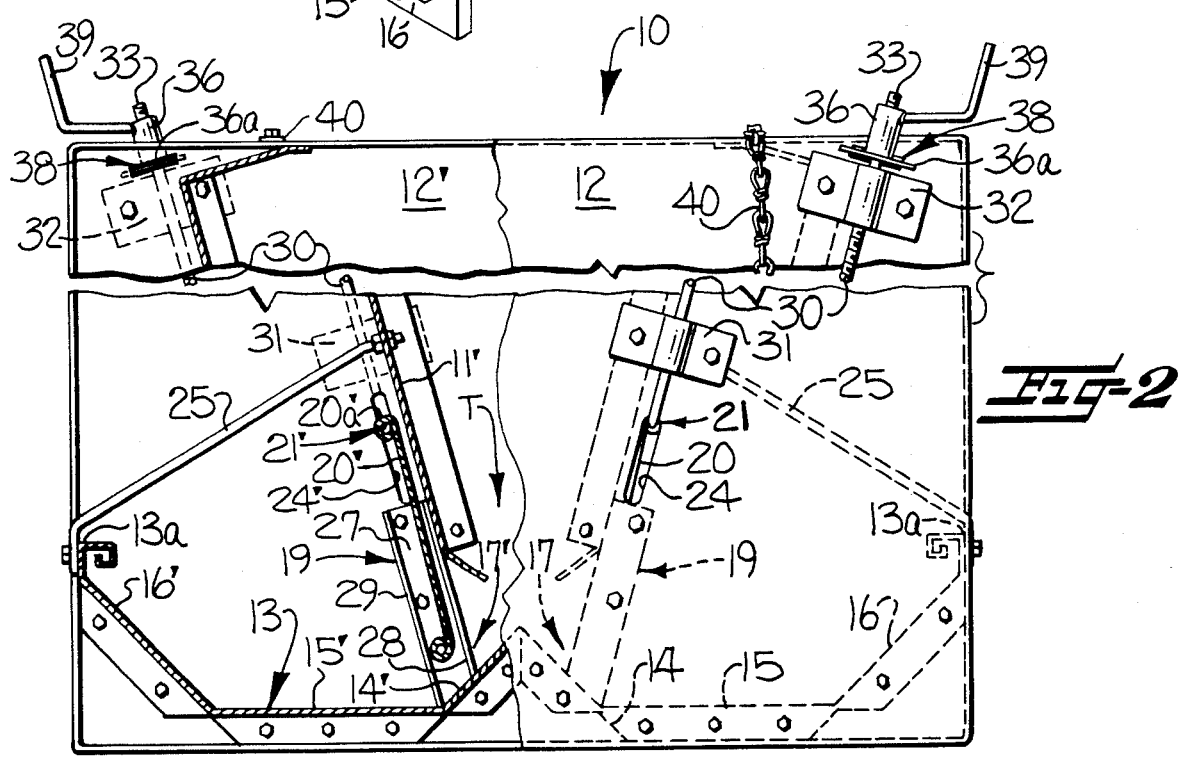
FIG. 2 is a compound sectional view along line 2—2 of FIG. 1 and showing both a partial side elevation and a partial cross-sectional view of the present invention.

The longitudinal central portion of bottom wall means 13 includes a pair of opposing downwardly sloping or diverging panel portions 14, 14', which are collectively substantially inverted V-shaped, and whose lower portions preferably terminate substantially in the vertical planes of the lower edges of the opposing downwardly converging side walls 11, 11' (see FIG. 3). The bottom wall means 13 has substantially horizontal panel portions 15, 15' extending outwardly from the lower terminal portions of the V-shaped panel portions 14, 14', and the outer end portions of the horizontal panel portions 15, 15' are connected to upwardly and outwardly inclined outer panel portions 16, 16' of the bottom wall means 13 thus forming elongate feed troughs along opposite sides of the feeder apparatus 10 and below the opposing side walls 11, 11'. The lower portions of the downwardly converging side walls 11, 11' define therebetween an escapement throat T, and since the bottom wall means 13 is spaced beneath the throat T, a feed discharge opening is defined between the lower edge of each side wall 11, 11' and the bottom wall means 13. The feed discharge openings defined by the lower edges of the respective opposing side walls 11, 11' are respectively broadly designated at 17, 17' in FIG. 2.

As another element of the feeder, reinforcing dividers, shown in the form of a plurality of spaced-apart elongate rods 25 (FIGS. 1 and 2) span the feeder trough from the side walls 11, 11' to respective outer folded edges 13a of the bottom wall 13. The rods 25 reinforce the hopper and divide each trough into individual feeding areas which serve to aid in giving pigs access to feed.

A pair of elongate, pivotally mounted, vertically adjustable gates 20, 20' overlie the respective feed discharge openings 17, 17' for varying the size of each opening 17, 17'. The gates 20, 20' extend longitudinally between the hopper end walls 12, 12' with the opposite ends of the gates terminating closely adjacent the end walls 12, 12'. A small clearance remains necessary between the ends of the gates 20, 20' and the end walls 12, 12' so that the gates 20, 20' may pivot freely in their described vertically adjusted positions. In order to avoid the undersirable flow of feed through this clearance rather than through the feed discharge openings 17, 17', a means for overlapping the gates and preventing the undesired flow is provided in the form of substantially U-shaped brackets or channel members broadly designated as 19, 19' at each end of each gate. The U-shaped brackets 19, 19' are suitably secured to the inner surfaces of the end walls 12, 12' and overlap and loosely straddle the respective ends of the respective gates 20, 20'.

The advantages provided by the U-shaped brackets 19, 19' are best described with reference to FIGS. 3 and 4. One advantage of the brackets 19, 19' is that they prevent the discharge of undesirably excessive amounts of feed through the discharge openings 17, 17' as a result of the agitation thereof by the pigs or other animals. In this regard, the brackets 19, 19' cooperate with each gate 20, 20' to permit only a predetermined limited swinging movement of the gates 20, 20' about their respective substantially horizontal axes irrespective of the positions of the gates between their fully opened and fully closed positions. As shown in the drawings, the U-shaped brackets 19, 19' comprise outer legs 29 and inner legs 28 positioned on a web portion 27 so as to loosely straddle the ends of the gates 20, 20'. The brackets 19, 19' on each end wall 12, 12' are further convergingly arranged in a downward direction so that the lower ends of the adjacent brackets 19, 19' are closer to each other than are the upper ends. Because of this arrangement of each bracket 19 and 19', the pivotally mounted gates 20, 20' normally rest in engagement with the outer legs 29 of the respective brackets 19, 19'. It will be seen from the drawings, especially FIG. 4, that as the gate 20' normally engages the outer leg 29 of the bracket 19', the gate is prevented from moving to a further outward true vertical position. Similarly, as gate 20' is pivoted inwardly when engaged by the snout of a pig, it is prevented from moving past an inner, more steeply inclined position by virtue of its engagement with the inner leg 28 of the bracket 19. The resulting definition of inner and outer inclined positions of the gates 20, 20' by the brackets 19, 19' provides the desired extent of pivotal movement of each gate and consequently permits agitation thereof by the pig's snout to effect delivery of feed from the hopper.

A primary advantage of the U-shaped brackets 19, 19' is that they help prevent the flow of feed around the ends of the gates 20, 20' rather than through the feed discharge openings 17, 17'. As shown by the drawings, the relationship of the inner legs 28 of the brackets 19, 19', the gates 20, 20', and the outer legs 29 of the brackets 19, 19' is such as to define sinuous paths through which the feed would have to flow in order to pass around the ends of the gates 20, 20' rather than through the feed discharge openings 17, 17'. Such sinuous paths obstruct the potential flow of feed around the ends of the gates 20, 20' and thus serve to aid in a proper flow of feed from the storage hopper through the feed discharge openings 17, 17'.

Referring more specifically to the gates 20, 20', it will be seen that a pair of pivot means broadly indicated at 21, 21' (FIGS. 1 and 2) are positioned exteriorly of, and above the lower edges of, the respective converging side walls 11, 11' and serve to pivotally support upper opposite end rolled edge portions 20a, 20a' of the respective gates 20, 20' on substantially horizontal and substantially parallel pivotal axes for inward and outward pivotal or swinging movement of the gates 20, 20' relative to the respective feed discharge openings 17, 17'.

Means are provided mounting each of the pivot means 21, 21' for independent, essentially vertical adjustment for adjusting each of the gates 20, 20' between a raised, open position and lowered, substantially closed position relative to the bottom wall means 13. By way of illustration, it will be observed in FIG. 2 that pivot means 21 is shown in a raised position while pivot means 21' is shown in a somewhat lowered position relative to the bottom wall means 13. In either instance, an upper portion of each gate 20, 20' overlies the outer surface of the respective side wall 11, 11'. In this regard, it has been determined that this overlapping relationship allows the side walls 11, 11' to be vibrated when the gates 20, 20' are pivoted by their engagement with the snouts of the feeding pigs. This vibration of the side walls 11, 11' in turn agitates the feed in the feed storage hopper, thus providing the desired flow of the feed from the hopper through the feed discharge openings 17, 17' and to the feeding pigs.

The pair of pivot means 21, 21' each comprises a respective pair of generally horizontally aligned pivot shafts 23 on which opposite ends of the upper portions of the respective gates 20, 20' are pivotally mounted. As will be explained later herein in more detail, the inner diameters of the rolled edge portions 20a, 20a' are somewhat larger than the outer diameters of the pivot shafts 23. Consequently, the pair of shafts 23 of each pivot means 21, 21' loosely penetrates the rolled edge portions 20a, 20a' and then extends outwardly through a respective pair of laterally spaced-apart inclined and downwardly converging elongate slots 24, 24' provided in each of the ends walls 12, 12' and located outwardly of and adjacent the downwardly convering opposing side walls 11, 11'. It is apparent, therefore, that those inclined slots 24 in opposing end walls 12, 12' accommodate those pivot shafts 23 extending from the rolled edge portions 20a on opposite ends of gate 20, and those slots 24' in end walls 12, 12' accommodate those pivot shafts 23 extending from the rolled edge portions 20a' on opposite ends of gate 20'.

Figure 1:
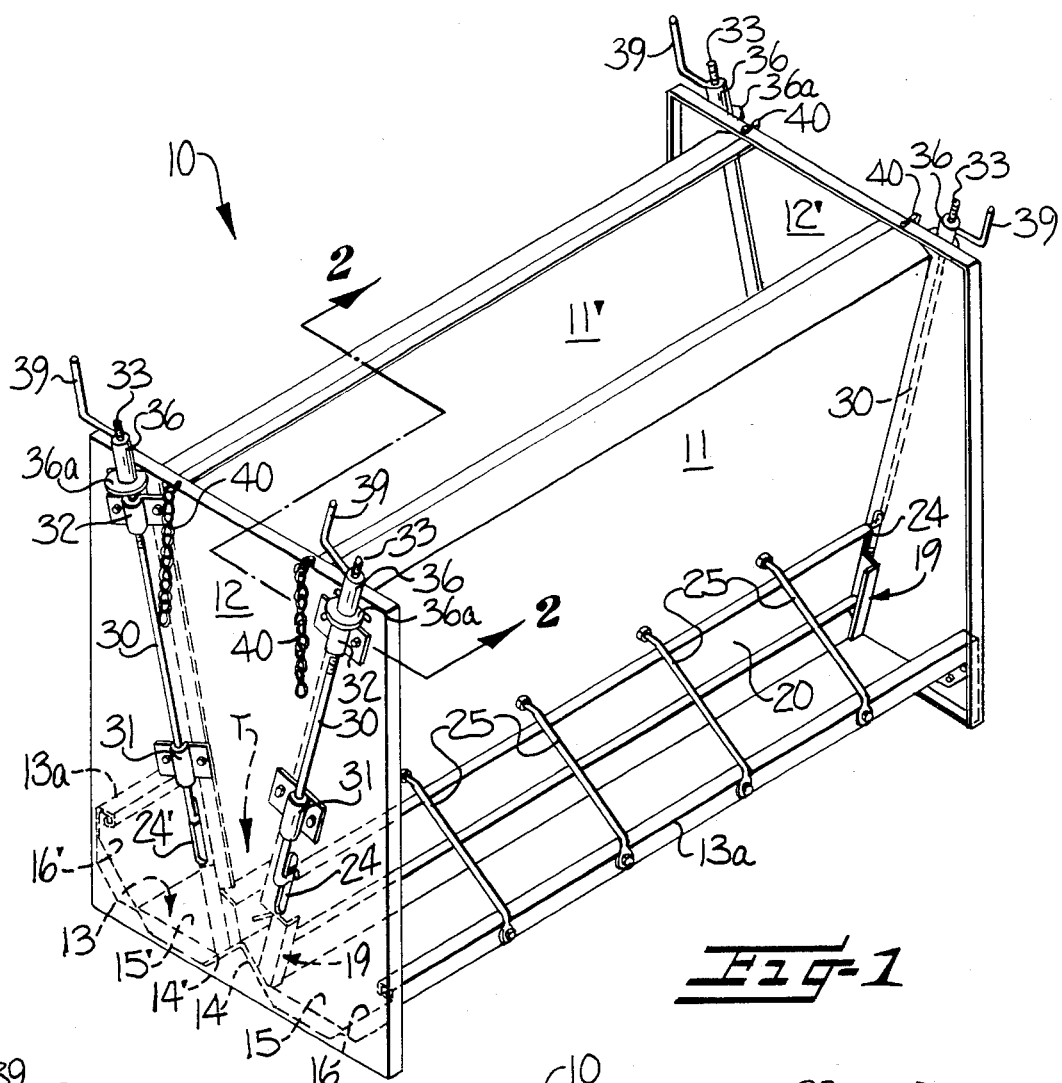
FIG. 1 is a perspective view looking at the top, one end and one side of an animal feeder embodying the present invention.

Since all of the pivot shafts 23 may be adjustably supported in essentially the same manner, the supporting means for only one of the pivot shafts 23 will be described and the same reference characters shall apply to all of the pivot shaft supporting means. Accordingly, as best shown in FIGS. 1 and 3, an elongate adjustable means is connected to each shaft 23 and extends upwardly therefrom and above the storage hopper end walls 12, 12' (see FIGS. 1, 2, 5 and 6) for effecting independent generally vertical adjustment of each end of each gate 20, 20'. To this end, the pivot shaft 23 shown in FIGS. 1 and 3 has an elongate member or arm 30 extending upwardly from an outer portion of the respective pivot shaft 23 and positioned outwardly of the respective end wall 12, 12' of the feeder apparatus 10. As preferred, each pivot shaft 23 is integral with its respective elongate arm 30, it being best shown in FIGS. 1 and 3 that the pivot shaft 23 and its arm 30 are illustrated in the form of a rod or bar, of circular cross section, which is bent at a right angle adjacent its lower end to form the respective pivot shaft 23 extending inwardly at a right angle from the arm 30. Thus, each pivot shaft 23 and its arm 30 are in the form of an integral L-shaped rod of substantially circular cross section.

Each arm 30 extends upwardly substantially in alignment with the respective inclined slot 24 or 24' and slideably or loosely penetrates a respective pair of lower and upper bracket means 31, 32 suitably secured to the respective end wall 12, 12', thus guidingly mounting the respective elongate arm 30. The upper bracket means 32 is disposed adjacent the upper edge of the respective end wall 12, 12' and is loosely or slideably penetrated by a threaded upper end portion 33 of the respective elongate arm 30.

Adjustment means serve to cooperate with and vertically adjust the elongate arms 30 and hence the gates 20, 20' and the feed discharge openings 17, 17'. As shown in FIGS. 5 to 7, each adjustment means comprises a threaded member 36 engaging the threaded upper end portion 33 of each of the elongate arms 30. A portion 36a of the threaded member 36, shown as an annular flange in the drawings, is received into and through an opening 38 in the end wall 12. As best shown in FIG. 7, the opening 38 has lower boundary 38a as defined by the edge of the end wall defining the lower extremity of the opening 38. Similarly the opening has an upper boundary 38b as defined by the edge of the end wall defining the upper extremity of the opening 38. Because the elongate arms 30 support the pivotally mounted gates 20, 20', the weight of the gates causes the flange portion 36a of the threaded member 36 to normally rest against the lower boundary 38a of the opening 38. The resulting cooperation between the weight of the gates, the flange portion 36a of the threaded member 36 and the lower end wall boundary 38a of the opening 38 upon which the flange portion 36a rests prevents relative downward vertical movement of the threaded member 36.

From the foregoing description, it can be seen that the substantially vertically adjustable elongate arms 30 and the pivot shafts 23 thereon provide for adjustment of each gate 20, 20' independently of the other gate as well as providing for adjustment of each end of each gate independently of the other end, this being particularly desirable to avoid the circumstance of one end of a particular gate becoming bound against the web 27 of a corresponding U-shaped bracket 19 or 19' in such a manner that it cannot be otherwise adjusted unless the other end of the gate is separately or independently adjustable.

The threaded member 36, however, can still be rotated around the axis defined by the elongate arm 30 upon which the threaded member 36 is threadably positioned. A means for imparting such rotation is attached, for example as by welding, to the upper portion of the threaded member 36 and is shown in the form of a crank handle 39, extending outwardly and upwardly from the threaded member so as to be easily accessible for impartation of vertical adjustment to the gates.

It will be observed that each crank handle 39 extends above the storage bin and walls 12, 12' so as to be readily accessible to an attendant for adjusting the gates 20, 20', even though there may be another or other animal feeders arranged in generally end-to-end relation to the instant feeder when in use.

When the crank handle 39 is used to impart rotation to the threaded member 36, the engagement of the threaded member 36 with the threaded upper end portion 33 of the elongate arm 30 causes relative movement to take place between the threaded member 36 and the arm 30 along the axis defined by the arm 30. Because the cooperation between the threaded member 36, the weight of the gates, and the lower boundary 38a of the opening 38 in the side wall 12 prevents lowered vertical movement of the threaded member 36, the relative movement between the elongate arm 30 and the threaded member 36 is translated into upward or downward vertical movement of the elongate arm 30 alone. In this manner the adjustment means serves to raise and lower the elongate arm 30, which in turn raises or lowers the pivotally mounted gates 20, 20' and provides a desired adjustment of the feed dischage openings 17, 17'.

Further to the goal of providing a desired flow of feed to the pigs, locking means are provided to prevent pigs from unlimitedly increasing the size of the feed discharge openings 17, 17' by lifting the gates 20, 20' with their snouts, while still allowing the lifting action of the snouts to impart a desirable limited amount of vertical movement to the gates and a consequent desirable agitation to the feed. This locking means comprises the upper boundary 38b of each of the openings 38 in the end walls 12. This upper boundary 38b is positioned close to the lower boundary 38a so that only a limited vertical movement of the flange portion 36a of the threaded member 36 may take place between the respective boundaries 38a and 38b. Consequently, should feeding pigs attempt to lift the gates 20, 20' upwardly with their snouts, the cooperation between the upper boundary 38b of the opening 38 and the flange portion 36a of the threaded member 36 will allow the desired, agitating limited vertical movement of the elongate arms 30 and in turn the gates 20, 20'.

In the development of the improved adjustment and locking means of this invention, it has been learned that the desirable agitation of the feed in the hopper can be enhanced by having various components of the feeder dimensioned and positioned to cooperate with each other in a manner which permits the pigs to effect considerably more agitation to the feed in the hopper than was possible in a feeder constructed in accordance with my prior U.S. Pat. No. 4,306,518.

This enhanced agitation allows the size of the feed discharge openings to be reduced or limited to as little as one quarter of an inch for certain feeds, a size which substantially eliminates waste of feed. In this respect, a limited or reduced amount of feed present in the feed trough always results in a reduced amount of feed being wasted by the pigs feeding at the trough. Desirably, as is known to those familiar with raising of pigs, the amount of feed present in the trough should be of a very shallow depth so that the pigs cannot get an excess amount in their mouths which can be dropped on the ground around the pig feeders and hence wasted. It is recognized in the pig raising industry that the waste of feed is a significant problem and a problem present to varying degrees in all known prior art feeders on the market.

One of the salient features of this invention for obtaining enhanced agitation of the feed in the hopper is the controlled or limited vertical movement of the gates by the snouts of pigs during the feeding of the pigs at the hopper. The width of the slot 38 being greater than the thickness of the flange portion 36a received therein, as noted earlier, permits this controlled, limited vertical movement. This controlled and limited upward vertical movement of the flange 36a in the slot 38 by snouts of pigs, in turn permits limited upward movement of the gates and thus imparts agitation to the gates. Adding to the agitation permitted to be imparted to the gates by the feeding pigs is the pivotal connection of the gates to the pivot shafts 23. These pivot shafts also permit the gates to be readily moved longitudinally along the pivot shafts 23, i.e. between the end walls 12, 12' of the hopper. In this regard as already noted earlier, the upper portions of the gates are each provided with the rolled edge portion 20a or 20a'. Desirably each rolled edge portion 20a, 20a' has an internal diameter greater than the external diameter of the respective pivot shaft 23. This difference in diameters permits pivotal movement, limited vertical movement and limited longitudinal movement of the gates as they hang from the pivot shafts 23 and between the end walls 12, 12' of the hopper. Further, adding to the agitation permitted to be imparted to the gates are the dimensions of the bracket means 31 and 32 which mount the adjustment rods 30 to the end walls. These dimensions permit some limited transverse movement of the rods guidingly carried in these bracket means and in turn permit additional desirable agitation of the gates.

As is known to those familiar with the feeding of pigs, pigs are intelligent enough to attempt to manipulate their feeding devices in an attempt to obtain more feed. To avoid excessive manipulation of the gate adjustment means by the pigs, a suitable link chain 40 is attached to the upper portion of the hopper so that, as shown in FIG. 5, links of the chain can be looped over the crank handle 39 with the crank handle passing through an individual link of the chain 40. Because the chain 40, when appropriately looped over the crank handle 39, prevents more than a few degrees of rotational movement of the crank handle 39 and the threaded member 36, no significant amount of vertical movement can be imparted to the elongate arms 30 and in turn to the gates 20, 20'.

It will thus be seen that there has been disclosed an animal feeder apparatus for supplying feeding animals such as pigs with the desired amounts of feed in an efficient manner. The feeder has pivotally mounted gates overlying feed discharge openings in a feed storage hopper. In order to prevent flow of feed around the ends of the pivoting gates and the resulting uncontrolled flow of the feed, means are positioned adjacent and overlapping each end of each of the gates. Additionally, adjustment means are provided for allowing manual vertical adjustment of the gates so as to give a desired size opening for feed to flow through. Further, locking means are disclosed for maintaining the gates in a desired adjusted position while still permitting limited vertical movement of the gates by the feeding pigs so as to aid in enhanced agitation of the feed by the feeding pigs while permitting a closer setting or adjustment of the gates.

In the drawings and specification there has been set forth a preferred embodiment of the invention, and although specific terms are employed, they are used in a generic and descriptive sense only and not for purposes of limitation, the scope of the invention being defined in the claims.

That which is claimed is:

1. An animal feeder apparatus, especially for feeding pigs and the like, comprising a feed storage hopper having opposing end walls and opposing downwardly converging side walls, and bottom wall means spaced beneath said opposing side walls and defining at least one feed discharge opening therebetween, at least one pivotally mounted gate overlying the feed discharge opening, said gate being pivotally movable from a normal outer inclined position to an inner inclined position, generally vertically positioned elongate means pivotally connected to each end of said gate for effecting said pivotal mounting of the gate, means mounting said elongate means so as to be positioned and extend upwardly along said hopper end walls, adjustable means connected to said pivotally mounted gate for effecting generally vertical adjustment of the gate for varying the size of the feed discharge opening and thereby varying the rate of flow of the feed therethrough, said adjustable means comprising each of said elongate means having threaded upper end portions, and a threaded member positioned on the threaded upper end portion of each of said elongate means and cooperating therewith for vertically adjusting said gate pivotally carried by said elongate means for varying the size of the feed discharge opening, upper portions of said hopper end walls having openings therein adjacent said threaded members and receiving portions of respective threaded members therein and cooperating therewith to serve as locking means for maintaining the gate in its desired adjusted position while permitting limited vertical movement of the gate for enhanced agitation of the feed from the storage hopper, means connected to each of said threaded members for facilitating imparting rotation to said threaded members for effecting vertical adjustment of the gate, and means positioned adjacent opposite ends of said pivotally mounted gate and overlapping the ends of the gate for preventing flow of feed from said storage hopper around the ends of the gate and thus preventing uncontrolled flow of feed and the wasting thereof.

2. An animal feeder apparatus, especially for feeding pigs and the like, comprising a feed storage hopper including opposing end walls and opposing downwardly converging side walls connected to and extending between said end walls and defining a feed escapement throat between lower portions thereof, and bottom wall means extending between said end walls and being spaced beneath said throat so as to define a feed discharge opening between the lower edge of each side wall and said bottom wall means, a pair of pivotally mounted gates positioned between said opposing end walls and overlying the respective feed discharge openings, said gates being pivotally movable from a normal outer inclined position to an inner inclined position, generally vertically positioned elongate means pivotally connected to each end of each of said gates for effecting said pivotal mounting of the gates, means mounting said elongate means so as to be positioned and extend upwardly along said end walls of said hopper, adjustable means connected to each pivotally mounted gate for effecting generally vertical adjustment of each gate for varying the size of the feed discharge openings and thereby varying the rate of flow of the feed therethrough, said adjustable means comprising each of said elongate means having threaded upper end portions, and a threaded member positioned on the threaded upper end portion of each of said elongate means and cooperating therewith for vertically adjusting said gates pivotally carried by said elongate means for varying the size of the feed discharge openings, upper portions of said hopper end walls having openings therein adjacent said threaded members and receiving portions of respective threaded members therein and cooperating therewith to serve as locking means for maintaining the gates in their desired adjusted position while permitting limited vertical movement of the gates for enhanced agitation of the feed from the storage hopper, means connected to each of said threaded members for facilitating imparting rotation to said threaded members for effecting vertical adjustment of the gates, and means positioned adjacent opposite ends of each of said pivotally mounted gates and overlapping the ends of the gates for preventing flow of feed from said storage hopper around the ends of the gates and thus preventing uncontrolled flow of feed and wasting thereof.

3. An animal feeder apparatus according to claim 2 wherein said means for preventing flow of feed around the ends of said gates comprises substantially U-shaped brackets positioned to straddle the respective ends of the gates, each bracket cooperating with an end of the gate to define therewith a sinuous path for obstructing the flow of the feed around the end of the gate, the brackets on corresponding ends of said gates being convergingly arranged relative to each other in a downward direction so that the lower ends of the brackets are closer to each other than the upper ends of the brackets, and the construction of the brackets and the converging relationship of the brackets on corresponding ends of the gates normally positioning the pivotally mounted gates in engagement with the brackets and in said normal outer inclined position and restraining the gates from moving to a further outward true vertical position, whereby the normal outer location of the gates positions the pivotally mounted gates for being engaged and pivotally moved inwardly to said inner inclined position by the snouts of the pigs for agitation of the feed in the storage hopper.

4. An animal feeder apparatus according to claim 2 wherein said means for preventing flow of feed around the ends of said gates comprises substantially U-shaped brackets positioned to straddle the ends of the gates, each bracket cooperating with an end of the gate to define therewith a sinuous path for obstructing the flow of the feed around the end of the gate, said brackets being so constructed as to loosely straddle the respective ends of the pivotally mounted gates so that pivotal movement may be imparted to the gates by the engagement therewith of the snouts of the feeding pigs whereby the pivotal movement of the gates in turn agitates the feed in the storage hopper, thereby aiding the flow of the feed from the storage hopper.

5. An animal feeder apparatus according to claim 4 wherein each of said U-shaped brackets include inner and outer leg portions and wherein said brackets are so positioned relative to said pivotally mounted gates that the gates are in engagement with the outer legs of said brackets when in said normal outer inclined position and thereby restrained from moving to a further outward true vertical position, whereby the normal outer position of the gates serves for locating the gates for being engaged and pivotally moved inwardly to said inner inclined position by the snouts of the pigs for agitation of the feed in the storage hopper.

6. An animal feeder apparatus, especially for feeding pigs and the like, comprising
a feed storage hopper including opposing end walls and opposing downwardly converging side walls connected to and extending between said end walls and defining a feed escapement throat between lower portions thereof, and bottom wall means extending between said end walls and being spaced beneath said throat so as to define a feed discharge opening between the lower edge of each side wall and said bottom wall means,
a pair of pivotally mounted gates positioned between said opposing end walls and overlying the respective feed discharge openings, said gates being pivotally movable from a normal outer inclined position to an inner inclined position,
generally vertically positioned elongate means pivotally connected to each end of each of said gates for effecting said pivotal mounting of the gates,
means mounting said elongate means so as to be positioned and extend upwardly along said end walls of said hopper,
means positioned adjacent opposite ends of each of said pivotally mounted gates and overlapping with the ends of the gates for preventing flow of feed from said storage hopper around the ends of the gates and thus preventing uncontrolled flow of feed and the wasting thereof,
said elongate means each having a lower end portion pivotally connected to an end of each of said gates and extending upwardly therefrom and terminating in a threaded upper end portion extending above the respective end wall of said storage hopper,
a threaded member positioned on the threaded upper end portion of each of said elongate means and cooperating therewith for vertically adjusting said gates pivotally carried by said elongate means for varying the size of the feed discharge openings,
upper portions of said hopper end walls having openings therein adjacent said threaded members and receiving portions of respective threaded members therein and cooperating therewith to serve as locking means for maintaining the gates in their desired adjusted position while permitting limited vertical movement of the gates for enhanced agitation of the feed from the storage hopper, and
manually engageable means connected to each threaded member and extending above each end wall and cooperating with each respective elongate means for effecting generally vertical adjustment of each gate relative to said walls of said storage hopper to thereby vertically adjust each of said gates for varying the rate of flow of the feed through the respective feed discharge opening.

7. An animal feeder according to claim 6 wherein said means for preventing flow of feed around the ends of said gates comprises substantially U-shaped brackets positioned to straddle the respective ends of the gates, each bracket cooperating with an end of the gate to define therewith a sinuous path for obstructing the flow of the feed around the end of the gate, the brackets on corresponding ends of said gates being convergingly arranged relative to each other in a downward direction so that the lower ends of the brackets are closer to each other than the upper ends of the brackets, the construction of the brackets and the converging relationship of the brackets on corresponding ends of the gates normally positioning the pivotally mounted gates in engagement with the brackets and in said normal outer inclined position and restraining the gates from moving to a further outward true vertical position, whereby the normal outer location of the gates positions the pivotally mounted gates for being engaged and pivotally moved inwardly by the snouts of the pigs for agitation of the feed in the storage hopper.

8. An animal feeder according to claim 6 wherein said means for preventing flow of feed around the ends of said gates comprises substantially U-shaped brackets positioned to straddle the ends of the gates, each bracket cooperating with an end of the gate to define therewith a sinuous path for obstructing the flow of the feed around the end of the gate, said brackets being so constructed as to loosely straddle the respective ends of the pivotally mounted gates so that pivotal movement may be imparted to the gates by the engagement therewith of the snouts of the feeding pigs whereby the pivotal movement of the gates in turn agitates the feed in the storage hopper, thereby aiding the flow of the feed from the storage hopper.

9. An animal feeder according to claim 8 wherein each of said U-shaped brackets includes inner and outer leg portions and wherein said brackets are so positioned relative to said pivotally mounted gates that the gates are in engagement with the outer legs of said brackets when in said normal outer inclined position and thus restrained from moving to a further outward true vertical position, whereby the normal outer position of the gates serves for locating the gates for being engaged and pivotally moved inwardly by the snouts of the pigs for agitation of the feed in the storage hopper.

* * * * *